US011870299B2

(12) United States Patent
Hosek et al.

(10) Patent No.: US 11,870,299 B2
(45) Date of Patent: Jan. 9, 2024

(54) MOTOR WITH COMPOSITE HOUSING

(71) Applicant: Persimmon Technologies, Corp., Wakefield, MA (US)

(72) Inventors: Martin Hosek, Lowell, MA (US); Christopher Hofmeister, Hampstead, NH (US)

(73) Assignee: Persimmon Technologies, Corp., Wakefield, MA (US)

( * ) Notice: Subject to any disclaimer, the term of this patent is extended or adjusted under 35 U.S.C. 154(b) by 0 days.

(21) Appl. No.: 14/988,814

(22) Filed: Jan. 6, 2016

(65) Prior Publication Data
US 2016/0197523 A1 Jul. 7, 2016

Related U.S. Application Data

(60) Provisional application No. 62/100,702, filed on Jan. 7, 2015.

(51) Int. Cl.
*H02K 1/02* (2006.01)
*H02K 5/02* (2006.01)
*H02K 15/02* (2006.01)

(52) U.S. Cl.
CPC ............... *H02K 1/02* (2013.01); *H02K 5/02* (2013.01); *H02K 15/02* (2013.01)

(58) Field of Classification Search
CPC .................................................. H02K 1/2706
USPC ................................................... 310/156.02
See application file for complete search history.

(56) References Cited

U.S. PATENT DOCUMENTS

| | | | | |
|---|---|---|---|---|
| 4,187,084 A | * | 2/1980 | Khomich | C09K 3/1436 264/12 |
| 4,257,830 A | * | 3/1981 | Tsuya | B22D 11/06 148/112 |
| 5,117,142 A | * | 5/1992 | von Zweygbergk | H02K 21/125 310/112 |
| 6,952,060 B2 | * | 10/2005 | Goldner | B60G 17/0157 310/12.13 |
| 7,279,820 B2 | * | 10/2007 | Grundl | H02K 21/145 310/156.02 |
| 8,299,669 B2 | * | 10/2012 | Gieras | B63H 23/24 310/156.02 |
| 2008/0246362 A1 | * | 10/2008 | Hirzel | H02K 21/12 310/156.02 |
| 2010/0237736 A1 | * | 9/2010 | Alfermann | H02K 1/148 310/216.091 |
| 2013/0000447 A1 | | 1/2013 | Hosek et al. | |
| 2013/0000860 A1 | | 1/2013 | Hosek et al. | |
| 2013/0000861 A1 | | 1/2013 | Hosek et al. | |

(Continued)

OTHER PUBLICATIONS

Hosek, Martin, et al., "Structures Utilizing a Structured Magnetic Material and Methods for Making", U.S. Appl. No. 14/501,668, filed Sep. 30, 2014, 116 pgs.

*Primary Examiner* — Alexander Talpalatski
(74) *Attorney, Agent, or Firm* — Harrington & Smith

(57) ABSTRACT

A motor assembly comprises a composite housing having a core of sprayed magnetic particles and a winding on the core; and a rotor having a magnet located thereon, the rotor being rotatably mounted within the winding. The core of sprayed magnetic particles comprises particles of an iron-containing material that when deposited results in an aggregate of small micro-domains separated by insulation boundaries.

9 Claims, 3 Drawing Sheets

(56) References Cited

U.S. PATENT DOCUMENTS

| | | | |
|---|---|---|---|
| 2013/0002085 A1* | 1/2013 | Hosek | B22F 3/115 |
| | | | 310/216.004 |
| 2013/0004359 A1 | 1/2013 | Hosek | |
| 2013/0292081 A1 | 11/2013 | Hosek et al. | |
| 2013/0342069 A1* | 12/2013 | Rowe | H01F 41/0246 |
| | | | 310/216.066 |
| 2014/0009025 A1 | 1/2014 | Hosek et al. | |
| 2014/0103752 A1 | 4/2014 | Hofmeister | |
| 2015/0115766 A1* | 4/2015 | Taguchi | H01F 27/02 |
| | | | 310/216.001 |
| 2015/0118407 A1* | 4/2015 | Hosek | B22F 1/02 |
| | | | 427/456 |
| 2016/0043602 A1* | 2/2016 | Hosek | C23C 8/02 |
| | | | 310/208 |

* cited by examiner

MOTOR WITH COMPOSITE HOUSING

CROSS REFERENCE TO RELATED APPLICATION

This application claims priority to U.S. provisional patent application No. 62/100,702 filed Jan. 7, 2015, which is hereby incorporated by reference in its entirety.

BACKGROUND

Technical Field

The exemplary and non-limiting embodiments disclosed herein relate generally to electric motors and, more particularly, to an electric motor with a composite housing having a stator core of a soft magnetic material.

Brief Description of Prior Developments

Electric motors are generally used to provide translational or rotational motion to the various moving elements of automated mechanical devices. The electric motors used typically comprise rotating elements (rotors) assembled with stationary elements (stators). Magnets are located between the rotating and stationary elements or directly on the rotating element. Coils are wound around soft iron cores on the stationary elements and are located proximate the magnets.

In operating an electric motor, an electric current is passed through the coils, and a magnetic field is generated, which acts upon the magnets. When the magnetic field acts upon the magnets, one side of the rotating element is pushed and an opposing side of the rotating element is pulled, which thereby causes the rotating element to rotate relative to the stationary element. Efficiency of the rotation is based at least in part on the characteristics of the materials used in the fabrication of the electric motor.

SUMMARY

The following summary is merely intended to be exemplary. The summary is not intended to limit the scope of the claims.

In accordance with one exemplary aspect, an apparatus comprises a first member; and a second member formed onto the first member by spray deposition of a magnetic material. The magnetic material comprises particles of an iron-containing material that when deposited from a spray results in an aggregate of small micro-domains separated by insulation boundaries.

In accordance with another exemplary aspect, a motor assembly comprises a composite housing having a core of sprayed magnetic particles and a winding on the core; and a rotor having a magnet located thereon, the rotor being rotatably mounted within the winding. The core of sprayed magnetic particles comprises particles of an iron-containing material that when deposited results in an aggregate of small micro-domains separated by insulation boundaries.

In another exemplary aspect, a method of fabricating a housing for a motor comprises depositing a plurality of iron-containing particles on a substrate using a spray deposition technique to form a magnetic core; and machining at least one surface of the magnetic core to provide at least one surface for receiving a winding of the motor.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
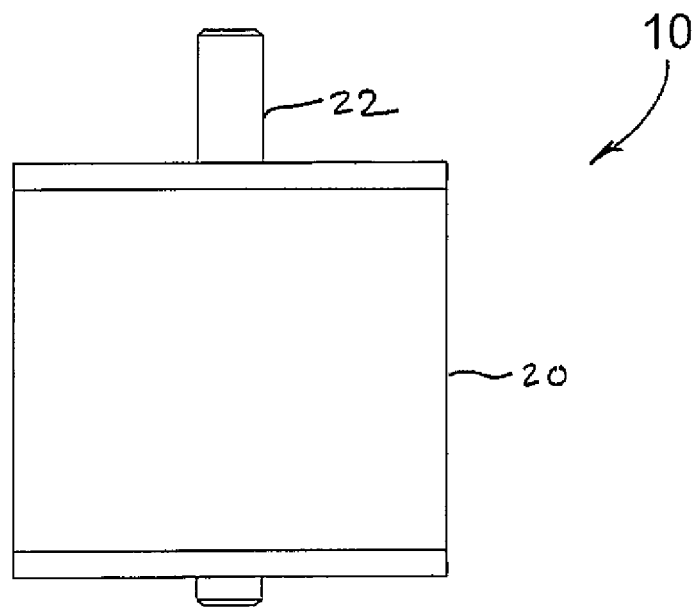
FIG. 1 is a schematic representation of one exemplary embodiment of a motor assembly.

Referring to FIG. 1, one exemplary embodiment of a motor assembly is designated generally by the reference number 10 and is hereinafter referred to as "motor 10." Although the features will be described with reference to the example embodiments shown in the drawings, it should be understood that features can be embodied in many alternate forms of embodiments. In addition, any suitable size, shape, or type of elements or materials could be used. For example, as shown, the motor 10 is of a radial flux design. In alternate embodiments, the motor may be of an axial flux design or a hybrid 3-dimensional flux design. The features of the embodiments disclosed herein may similarly be applied to any motor, system, or component incorporating a core comprising a soft magnetic material.

Motor 10 and the subcomponents within motor 10 may have features as disclosed in the following references, all of which are hereby incorporated by reference herein in their entireties: U.S. patent application Ser. No. 14/501,603, entitled "Structures Utilizing a Structured Magnetic Material and Methods for Making" filed Sep. 30, 2014; U.S. patent application Ser. No. 14/501,668, entitled "Structures Utilizing a Structured Magnetic Material and Methods for Making" filed Sep. 30, 2014; U.S. Patent Publication No. 2014/0009025 A1, entitled "Hybrid Field Electric Motor" published Jan. 9, 2014; U.S. Patent Publication No. 2013/0000861 A1, entitled "System and Method for Making Structured Magnetic Material from Insulated Particles" published Jan. 3, 2013; U.S. Patent Publication No. 2013/0004359 A1, entitled "System and Method for Making a Structured Material" published Jan. 3, 2013; U.S. Patent Publication No. 2013/0002085 A1, entitled "Structured Magnetic Material" published Jan. 3, 2013; U.S. Patent Publication No. 2014/0103752 A1, entitled "Hybrid Motor" published Apr. 17, 2014; U.S. Patent Publication No. 2013/0292081 A1, entitled "System and Method for Making a Structured Magnetic Material with Integrated Particle Insulation" published Nov. 7, 2013; U.S. Patent Publication No. 2013/0000860 A1, entitled "System and Method for Making a Structured Magnetic Material via Layered Particle Deposition" published Jan. 3, 2013; and U.S. Patent Publication No. 2013/0000447 A1, entitled "System and Method for Making a Structured Magnetic Material with Integrated Particle Insulation" published Jan. 3, 2013.

Motor 10 comprises a composite housing 20 (hereinafter "housing 20"), a rotor 40, and an output shaft 22. The output shaft 22 is coupled to the rotor 40 and extends from the housing 20. As shown below, the output shaft 22 may extend axially through the rotor 40. In some embodiments, however, the rotor 40 and the output shaft 22 may comprise a unitary member. In any configuration, the operation of the motor 10 causes axial rotation of the output shaft 22. The output shaft 22 may be coupled to any suitable apparatus to change the electrical energy of the motor 10 into mechanical energy.

Figure 2:
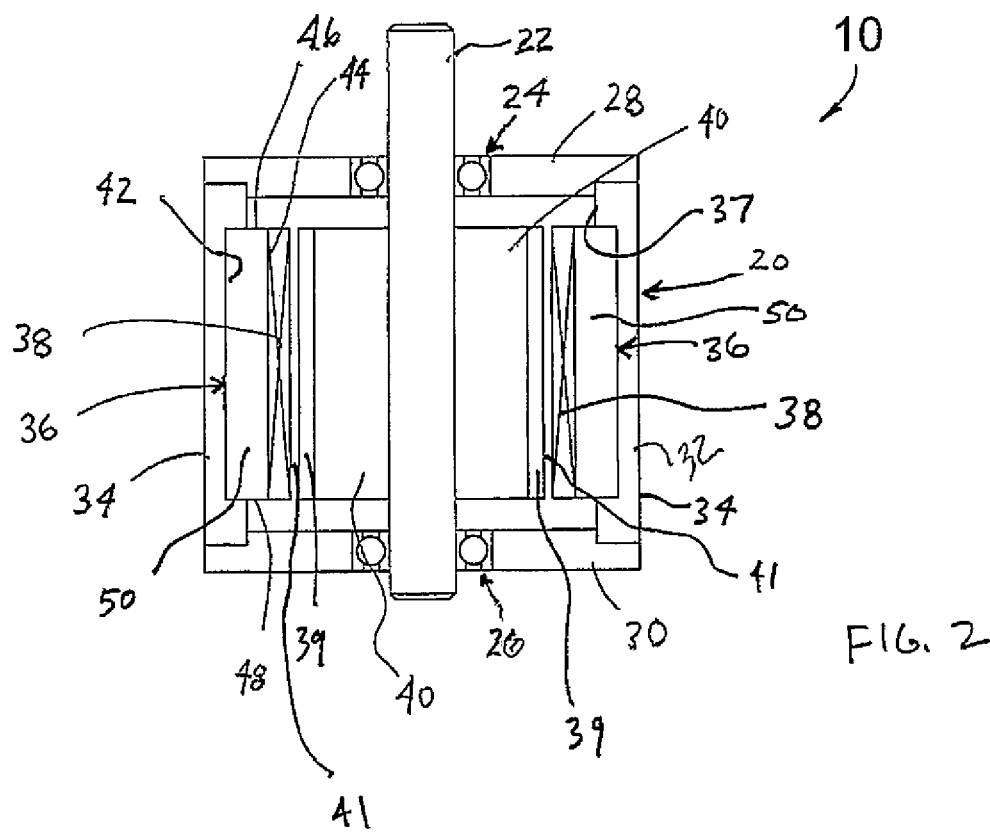
FIG. 2 is a schematic cross-sectional representation of the motor assembly of FIG. 1.

Referring to FIG. 2, the housing 20 includes a shell 34, a stator 36 located within the shell 34, and a winding 38 on an inner-facing surface of the stator 36. The housing 20 is defined by the shell 34 comprising a substantially cylindrical member 37 open at a top end and at a bottom end. The cylindrical member 37 comprises an inner-facing surface on which the stator 36 is mounted. A first end cover 28 may be disposed at one end, and a second end cover 30 may be disposed at the opposing end. The rotor 40 includes one or more magnets 39 on the outer surface of the rotor 40 and is rotatably mounted within the winding 38. An air gap 41 is defined between the rotor 40 (e.g., the magnet 39) and an inner-facing surface of the winding 38.

The inner-facing surface of the substantially cylindrical member 37 comprises a recess 42 configured to receive a core material 50 (hereinafter "core 50") of the stator 36. The recess 42 defines a mold or cavity in the inner-facing surface of the substantially cylindrical member 37, the shape and form of the recess 42 as shown being merely exemplary, with alternate aspects of the recess having any suitable shape, form, or features to form the stator 36.

Bearings 24, 26 are located in the first end cover 28 and the second end cover 30, respectively, to support the output shaft 22. Each bearing 24, 26 may comprise an outer race and an inner race between which rolling elements may be contained for the distribution of loads. As shown, the rolling elements are balls (ball bearings). However, other rolling elements may be used in the bearings 24, 26. Other rolling elements that may be used include, but are not limited to, roller bearings, needle bearings, and the like. The rotor 40 is mounted within the winding 38 with the output shaft 22 being fixed to the inner races such that the rotor 40 and the output shaft 22 are axially rotatable in the housing 20.

The core 50 comprises a soft magnetic material that may be directly deposited into the recess 42, with the soft magnetic material subsequently being built up by continued deposition of material. The soft magnetic material bonds to surfaces of the mold or cavity formed by the recess 42 without additional fastening features.

The soft magnetic material forming the core 50 may be deposited into the recess 42 using any suitable deposition process. One exemplary process for the deposition of the soft magnetic material uses a metal spray technique. A system used for the metal spray technique may be a High Velocity Air Fuel (HVAF) system, a High Velocity Oxy-Fuel (HVOF) system, or a plasma spray system.

The soft magnetic material may be a microstructure material of suitable softness and mechanical strength and may be deposited as particles of an alloying element in a reactive atmosphere to produce an aggregate of small micro-domains of high permeability and low coercivity. The particles of the alloying element may comprise an iron-containing material such as iron-aluminum alloy. The iron-containing material may further include, for example, aluminum, carbon, cobalt, molybdenum, nickel, silicon, or combinations of the foregoing materials. Deposition of the particles in the reactive atmosphere may cause an oxide (e.g., alumina) coating to form on the particles. In one exemplary embodiment, the iron-containing material comprises about 89 wt. % iron, about 10 wt. % aluminum, and about 0.25 wt. % carbon.

Various parameters of the deposition process (temperature, particle velocity, particle size range, chemical composition, and the like) may be controlled to facilitate the formation of insulation boundaries, which may separate the micro-domains to limit electrical conductivity between the micro-domains. Use of the soft magnetic material and control of the various parameters allows for gains in performance and efficiency of the motor 10. For example, use of the soft magnetic material as the core 50 may provide an efficient magnetic path while minimizing losses associated with eddy currents induced in the winding 38 due to rapid changes in magnetic fields as the rotor 40 rotates relative to the core 50.

Once deposited, the soft magnetic material may be subjected to additional machining from a near-net shape to a final shape. For example, surfaces 44, 46, and 48 may be finish-machined prior to installation of the winding 38. In this manner, the housing 20 forms a composite structure having the soft magnetic material adhered to the inner surface of the shell 34.

Generally, any suitable motor topology may be provided where the housing 20 is formed partially or completely from or as a mold or surface to which the sprayed or otherwise deposited soft magnetic material of the core 50 may be adhered. In one exemplary aspect, the soft magnetic material of the core 50 may form a ring, for example, where the motor 10 is of a toothless or a slot-less topology. In another exemplary aspect, the soft magnetic material of the core 50 may form a ring with teeth, for example, where the motor is of a toothed or slotted topology. In still other exemplary aspects, the soft magnetic material may form a core of any other suitable shape.

Figure 3:
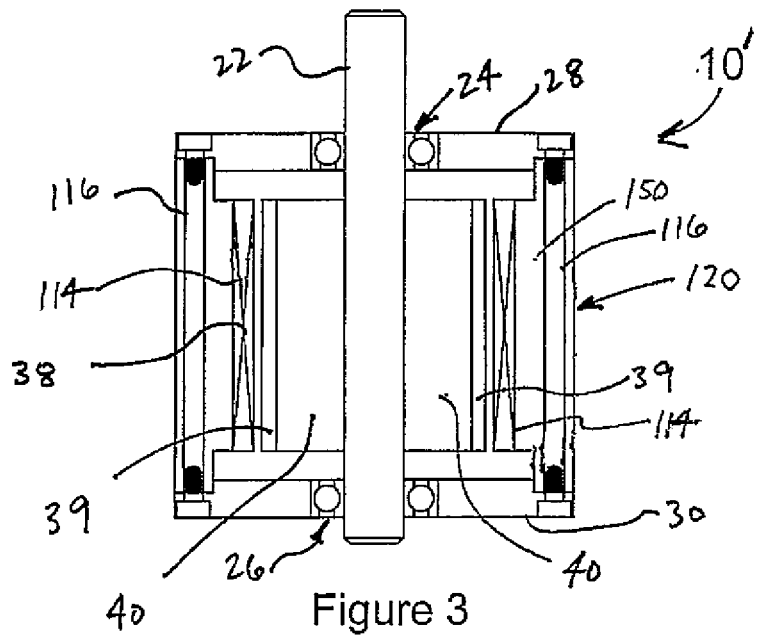
FIG. 3 is a schematic cross-sectional representation of another exemplary embodiment of a motor assembly.

Referring to FIG. 3, another exemplary embodiment of a motor assembly is designated generally by the reference number 10' and is hereinafter referred to as "motor 10'." Motor 10' has features similar to those of motor 10 as described above. However, a housing 120 of the motor 10' may differ in various aspects as compared to housing 20. In one exemplary aspect of the motor 10', the housing 120 may comprise a soft magnetic core 150 that differs from the core 50 of motor 10 in that the core 150 itself comprises a primary structure of the housing 120 without a secondary support structure. For example, the housing 120 may lack the shell 34 but may include a mold sleeve 114 and inserts 116.

Figure 4:
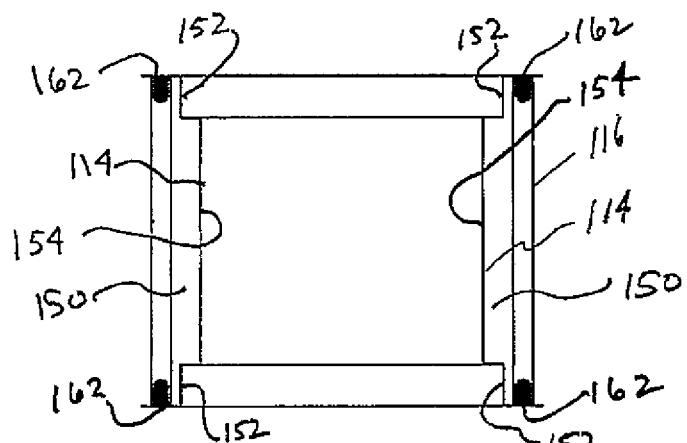
FIG. 4 is a schematic cross-sectional representation of a core of the motor assembly of FIG. 3.

Referring to FIG. 4, the mold sleeve 114 may be, for example, a formed metal sleeve on which soft magnetic material is sprayed on an outer-facing surface to form the core 150, the mold sleeve 114 forming the inner shape of the housing 120 (as opposed to the shell forming an exterior surface of the housing 20) on which the winding 38 may be disposed. As shown, the mold sleeve 114 may be configured such that when the soft magnetic material is sprayed to form the core 150, end portions 152 of the core 150 are thinner than a middle portion 154 of the core 150 to accommodate the end covers 28, 30. Holes may be bored or otherwise formed lengthwise in the sprayed core 150 so as to extend from a first end to a second end. The holes may receive the inserts 116, which may be configured to threadedly receive fasteners 162 that attach the first end cover 28 and the second end cover 30 to the core 150. In the alternative, the holes may be tapped (without inserts 116) to receive threaded fasteners 162 for attaching the first end cover 28 and the second end cover 30.

Figure 5:
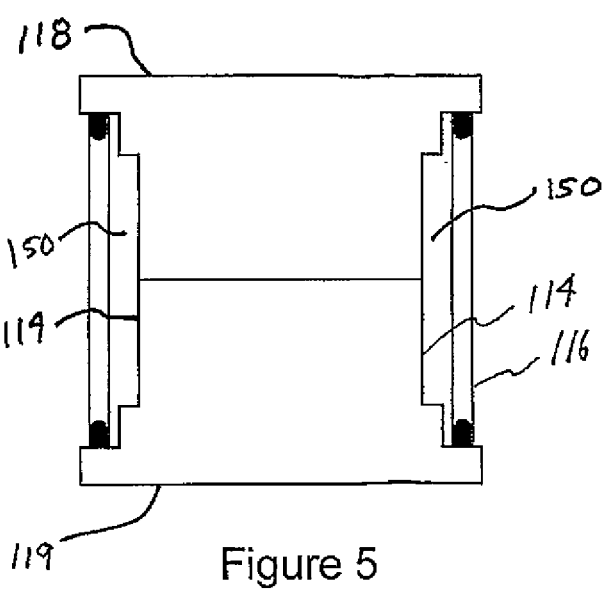
FIG. 5 is a schematic cross-sectional representation of the core of the motor assembly of FIG. 3 formed on a two-piece mold core.

Referring to FIG. 5, the mold sleeve 114 may be a thin foil or similar non-structural element that is supported on a structural mold core 118, 119. Once the mold sleeve 114 is supported on the structural mold core 118, 119, the soft magnetic material is sprayed onto the mold sleeve 114 to form the core 150, with the mold sleeve 114 either forming the finished inner shape of the housing 120 or subsequently being removed. The structural mold core 118, 119 may comprise two (or more) pieces that may be assembled, the assembled structural mold core 118, 119 being porous such that a vacuum may be pulled on the mold sleeve 114 to vacuum-form the mold sleeve 114 to the mold core 118, 119 prior to spray deposition of the soft magnetic material to form the core 150.

In another exemplary embodiment, the mold sleeve 114 may not be provided and the core 150 sprayed directly onto the structural mold core 118, 119 to form the net shape of the housing 120.

In any embodiment, the inserts 116 may be any suitable inserts embedded into or formed in the core 150. The inserts 116 are shown extending into or through the core 150 from a first end to a second end of the housing 120. In one aspect, for example, the inserts 116 may be threaded inserts where soft magnetic material forming the core 150 may be sprayed on and around the inserts 116 to form the outer shape of the housing 120. In other aspects, each of the inserts 116 may be two pieces, each at different ends of the housing and held in place temporarily during the spray deposition. In still other aspects, inserts 116 may not be provided where the core 150 is sprayed directly onto screws (or other suitable fasteners) to form the net shape of the housing 120.

Figure 6:
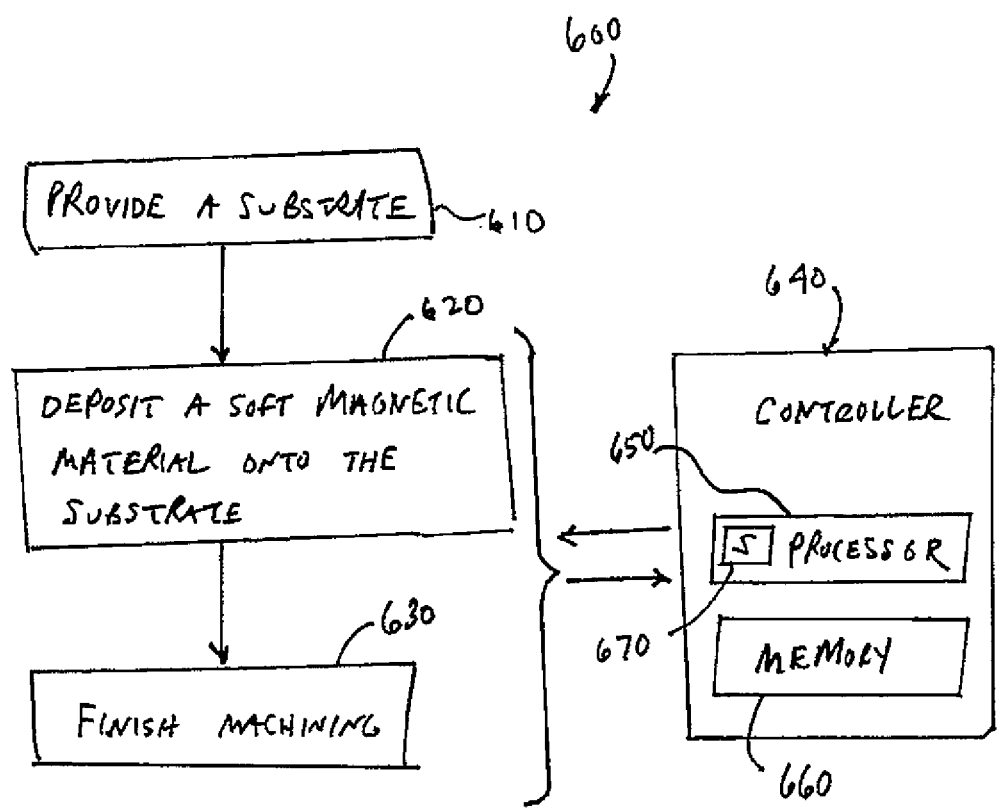
FIG. 6 is a flow of a process of forming a housing of a motor assembly.

Referring to FIG. 6, one exemplary method of forming a housing for a motor assembly is shown generally at 600 and is hereinafter referred to as "method 600." In method 600, a substrate is provided at 610. The substrate may be the substantially cylindrical member 37 of the shell 34, the mold sleeve 114, mold core 118, 119, or any other metal sleeve, foil, or support. The soft magnetic material is deposited onto the substrate at 620 using a suitable deposition process. At 630, the deposited soft magnetic material is machined to provide a surface for receiving the winding 38.

All or any portion of the method 600 may be carried out using a controller 640 having a processor 650 and a memory 660. For example, the controller 640 may be used to control the deposition of the soft magnetic material on the substrate (e.g., temperature, particle velocity, particle size range, chemical composition, and the like) as well as any machining steps. The processor 650 may include software 670.

In accordance with one exemplary aspect, an apparatus comprises a first member; and a second member formed onto the first member by spray deposition of a magnetic material. The magnetic material comprises particles of an iron-containing material that when deposited from a spray results in an aggregate of small micro-domains separated by insulation boundaries.

In the apparatus, the first member may comprise a shell that forms an exterior surface of a housing for a motor assembly or a mold sleeve that forms an inner surface of a housing for a motor assembly. The iron-containing material may comprise an iron-aluminum alloy. The iron-containing material may further comprise carbon, cobalt, molybdenum, nickel, silicon, or a combination of at least two of the foregoing materials.

In accordance with another exemplary aspect, a motor assembly comprises a composite housing having core of sprayed magnetic particles and a winding on the core; and a rotor having a magnet located thereon, the rotor being rotatably mounted within the winding. The core of sprayed magnetic particles comprises particles of an iron-containing material that when deposited results in an aggregate of small micro-domains separated by insulation boundaries.

In the motor assembly, the composite housing may further comprise a shell having an inner-facing surface on which the core of sprayed magnetic particles is formed. The motor assembly may further comprise a recess in the shell, the core of sprayed magnetic particles being formed in the recess. The composite housing may further comprise a mold sleeve having an outer-facing surface on which the core of the sprayed magnetic particles is formed. The motor assembly may further comprise a hole in the core, the hole being configured to receive a fastener for coupling an additional element to the core. The motor assembly may further comprise an insert in the hole in the core, the insert being configured to receive a fastener. The rotor may comprise an output shaft. The iron-containing material may comprise an iron-aluminum alloy. The iron-containing material may further comprise carbon, cobalt, molybdenum, nickel, silicon, or a combination of at least two of the foregoing materials.

In accordance with another exemplary aspect, a method of fabricating a housing for a motor comprises depositing a plurality of iron-containing particles on a substrate using a spray deposition technique to form a magnetic core; and machining at least one surface of the magnetic core to provide at least one surface for receiving a winding of the motor.

In the method, depositing a plurality of iron-containing particles on a substrate using a spray deposition technique may comprise using a High Velocity Air Fuel (HVAF) system, a High Velocity Oxy-Fuel (HVOF) system, or a plasma spray system. Depositing a plurality of iron-containing particles on a substrate using a spray deposition technique may comprise spraying iron-containing particles on an inner-facing surface of a shell comprising a substantially cylindrical member or on an outer-facing surface of a mold sleeve. The method may further comprise removing the substrate after depositing a plurality of iron-containing particles. Depositing a plurality of iron-containing particles on a substrate using a spray deposition technique may comprise vacuum-forming a non-structural element on a mold core prior to spraying the iron-containing particles.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications, and variances which fall within the scope of the appended claims.

What is claimed is:

1. An apparatus comprising:
   a first member comprising a shell that forms an exterior surface of a housing for a motor assembly;
   a drive shaft extending longitudinally through the first member, the drive shaft being rotatable relative to the first member; and
   a soft magnetic material formed onto the first member by spray deposition of a magnetic material, the magnetic material being bonded to an inner portion of the shell, the inner portion of the shell comprising a recessed surface defining a cavity, the recessed surface extending continuously around the inner portion of the shell and being equidistant in radial directions from the drive shaft;

wherein the soft magnetic material comprises particles of an iron-containing material built up by a continuous deposition of the particles, each particle having an aluminum oxide coating thereon, a plurality of the particles forming an aggregate of small micro-domains, the micro-domains being separated by oxide insulation boundaries, the soft magnetic material providing a magnetic path that limits losses associated with the formation of eddy currents in the soft magnetic material, and the oxide insulation boundaries limiting electrical conductivity; and wherein the iron-containing material comprises an iron-aluminum alloy comprising about 89 wt. % iron, about 10 wt. % aluminum, and about 0.25 wt. % carbon; and wherein the oxide insulation boundaries are aluminum oxide.

2. The apparatus of claim 1, wherein the first member comprises a mold sleeve that forms an inner surface of a housing for a motor assembly.

3. The apparatus of claim 1, wherein the iron-containing material further comprises cobalt, molybdenum, nickel, silicon, or a combination of at least two of the foregoing materials.

4. A motor assembly, comprising:
a composite housing having,
a shell,
a core of sprayed magnetic particles bonded to an inner-facing surface of the shell and forming a stator,
a recess in the inner-facing surface of the shell, the recess defining a cavity in the inner-facing surface, and
a winding on the core; and
a rotor having a magnet located thereon, the rotor being rotatably mounted within the winding and having an output shaft;

wherein a surface of the cavity defined by the recess extends longitudinally along a length of the shell and continuously around a cross section of the shell and is equidistant in radial directions from the output shaft;

wherein the core of sprayed magnetic particles comprises particles of an iron-containing material built up by a continuous deposition of the particles, each particle having an aluminum oxide coating thereon such that when deposited a plurality of the particles forms an aggregate of small micro-domains, each of the aggregates separated by oxide insulation boundaries, the iron-containing material providing a magnetic path that limits losses associated with the formation of eddy currents in the core, and the oxide insulation boundaries limiting electrical conductivity; and wherein the iron-containing material comprises an iron-aluminum alloy comprising about 89 wt. % iron, about 10 wt. % aluminum, and about 0.25 wt. % carbon; and wherein the oxide insulation boundaries are aluminum oxide.

5. The motor assembly of claim 4, wherein the core of sprayed magnetic particles is formed in the recess.

6. The motor assembly of claim 4, wherein the composite housing further comprises a mold sleeve having an outer-facing surface on which the core of the sprayed magnetic particles is formed.

7. The motor assembly of claim 6, further comprising a hole in the core, the hole being configured to receive a fastener for coupling an additional element to the core.

8. The motor assembly of claim 7, further comprising an insert in the hole in the core, the insert being configured to receive a fastener.

9. The motor assembly of claim 4, wherein the iron-containing material further comprises cobalt, molybdenum, nickel, silicon, or a combination of at least two of the foregoing materials.

* * * * *